US008150454B2

(12) United States Patent
Sanders

(10) Patent No.: US 8,150,454 B2
(45) Date of Patent: Apr. 3, 2012

(54) SYSTEM AND METHOD FOR IMPLEMENTING ANTENNA DIVERSITY

(75) Inventor: Stuart B. Sanders, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 930 days.

(21) Appl. No.: 11/306,175

(22) Filed: Dec. 19, 2005

(65) Prior Publication Data

US 2007/0142001 A1    Jun. 21, 2007

(51) Int. Cl.
*H04M 1/00*    (2006.01)
(52) U.S. Cl. ............. 455/553.1; 455/552.1; 455/575.7
(58) Field of Classification Search .... 455/552.1–553.1, 455/575.7
See application file for complete search history.

(56) References Cited

U.S. PATENT DOCUMENTS

| | | | | |
|---|---|---|---|---|
| 4,803,447 | A | * | 2/1989 | Schultz et al. ............... 333/103 |
| 5,809,405 | A | * | 9/1998 | Yamaura ..................... 455/101 |
| 6,714,733 | B2 | | 3/2004 | Kobayashi |
| 7,444,119 | B2 | * | 10/2008 | Bekritsky .................... 455/41.2 |
| 2003/0124982 | A1 | * | 7/2003 | Saari et al. .................. 455/67.4 |
| 2004/0087295 | A1 | * | 5/2004 | Abbasi et al. .............. 455/277.1 |
| 2004/0225786 | A1 | * | 11/2004 | Puupponen et al. .......... 710/240 |
| 2005/0009524 | A1 | * | 1/2005 | Garani et al. ................ 455/445 |
| 2005/0201350 | A1 | | 9/2005 | Kanzawa |
| 2006/0276132 | A1 | * | 12/2006 | Sheng-Fuh et al. .......... 455/41.2 |

FOREIGN PATENT DOCUMENTS

| | | |
|---|---|---|
| EP | 1521379 A1 | 4/2005 |
| JP | 02042826 A | 2/1990 |
| JP | 05068145 U | 9/1993 |
| JP | 2002009679 A | 1/2002 |
| JP | 2003078436 A | 3/2003 |
| JP | 2004007162 A | 1/2004 |
| JP | 2004363963 A | 12/2004 |
| JP | 2005236570 A | 9/2005 |

OTHER PUBLICATIONS

PCT International Search Report for corresponding PCT Application No. PCT/US2006/030355 dated Jan. 30, 2007.
PCT Written Opinion for corresponding PCT Application No. PCT/US2006/030355 dated Jan. 30, 2007.
International Preliminary Report on Patentability, corresponding to International Patent Application No. PCT/US2006/030355, dated Jul. 3, 2008.
Japanese Patent Office; First Office Action; Apr. 22, 2011; issued in Japanese Patent Application No. 2008-545572.
Japanese Patent Office; Final Office Action; Sep. 8, 2011; issued in Japanese Patent Application No. 2008-545572.
State Intellectual Property Office, P.R. China; Sep. 30, 2011; issued in Chinese Patent Application No. 200680052961.0.

* cited by examiner

*Primary Examiner* — Steven Lim
(74) *Attorney, Agent, or Firm* — Sreenivas Vedantam; Moore & Van Allen, PLLC

(57) ABSTRACT

A system, communications device, method and computer program product for implementing antenna diversity may include a first switch to selectively connect a first radio section to one of a plurality of antennas and a second switch to selectively connect a second radio section to one of the plurality of antennas. The system may also include an antenna detector to detect which one of the plurality of antennas is connected to a port of the first radio section and to a port of the second radio section.

42 Claims, 4 Drawing Sheets

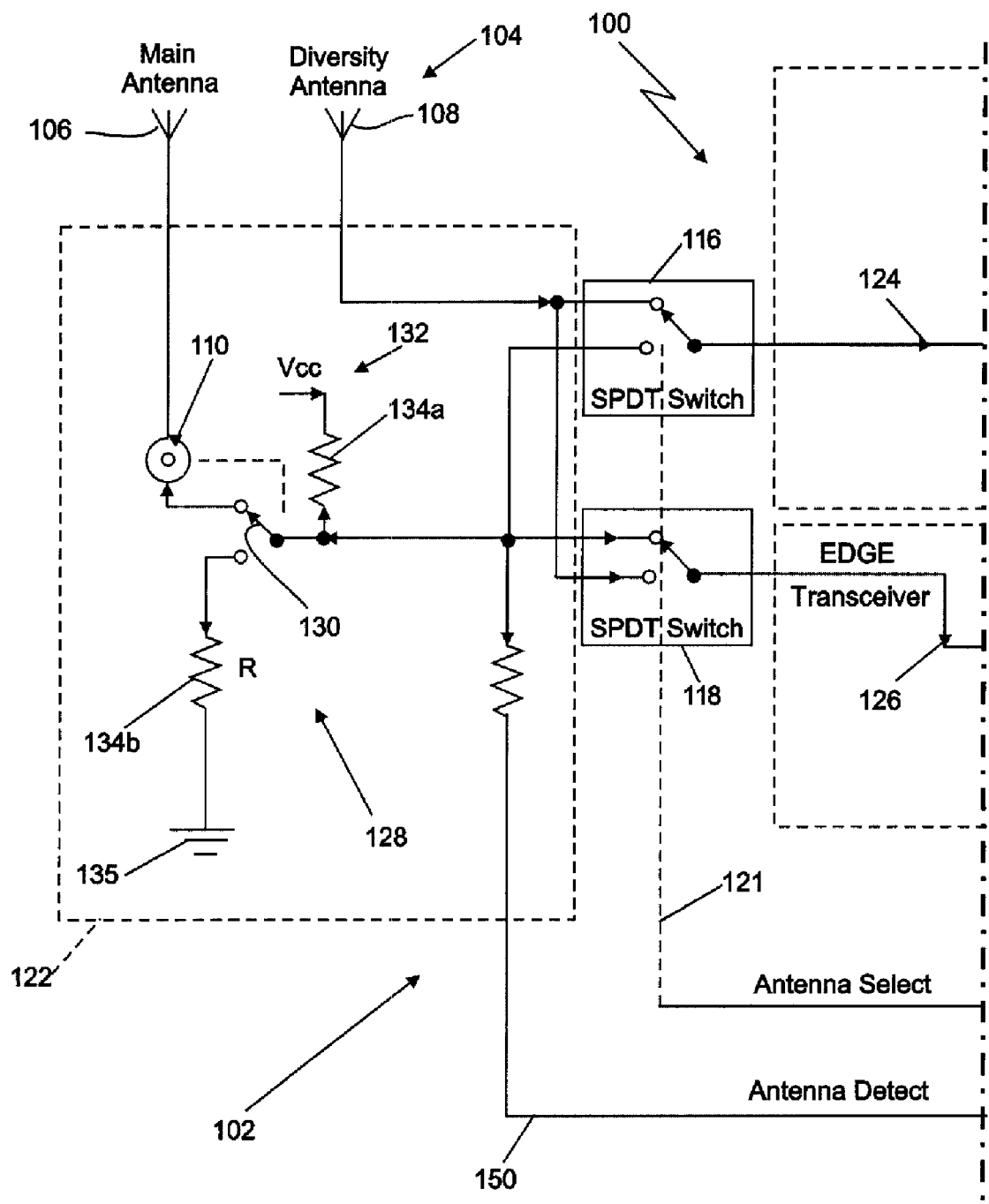

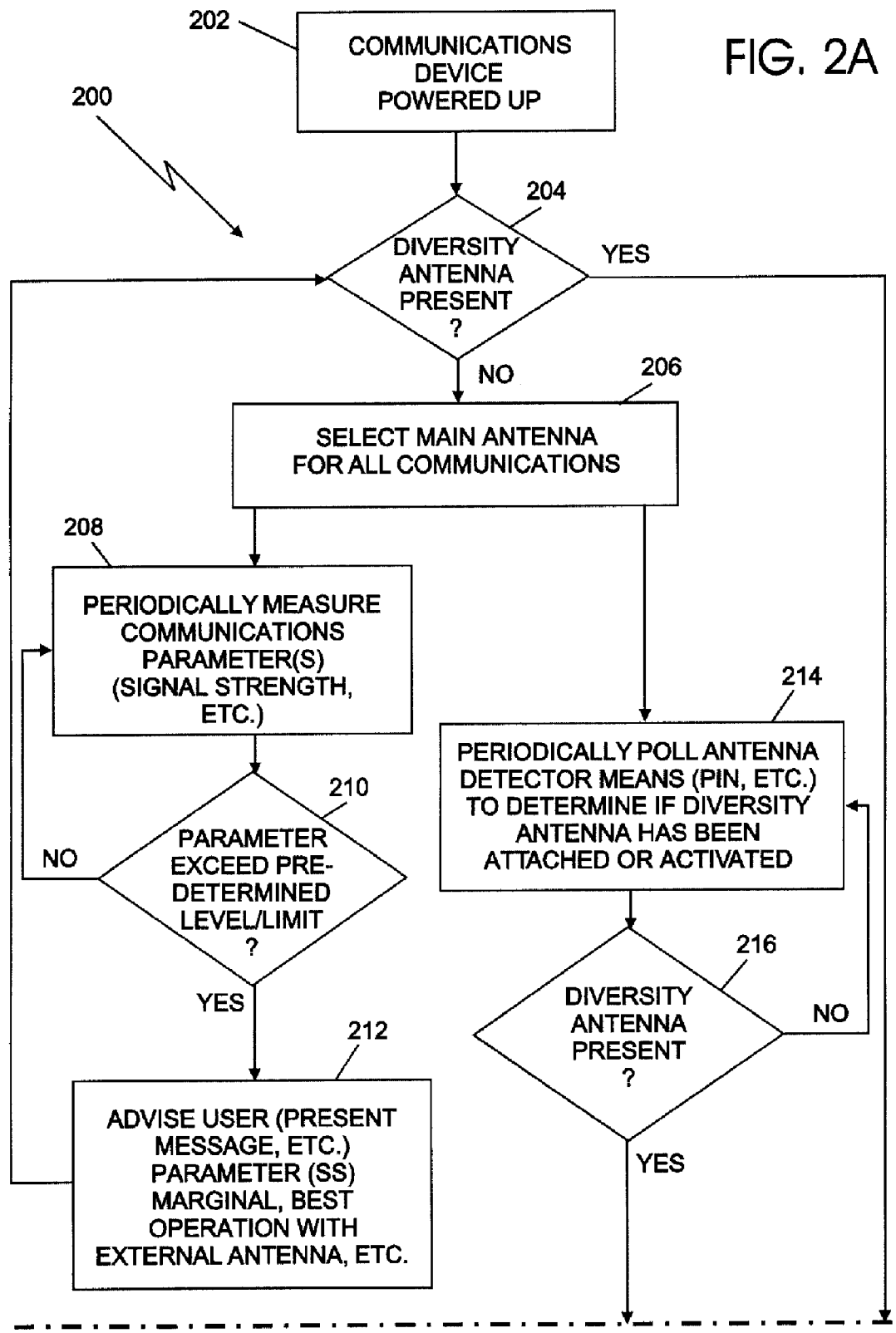

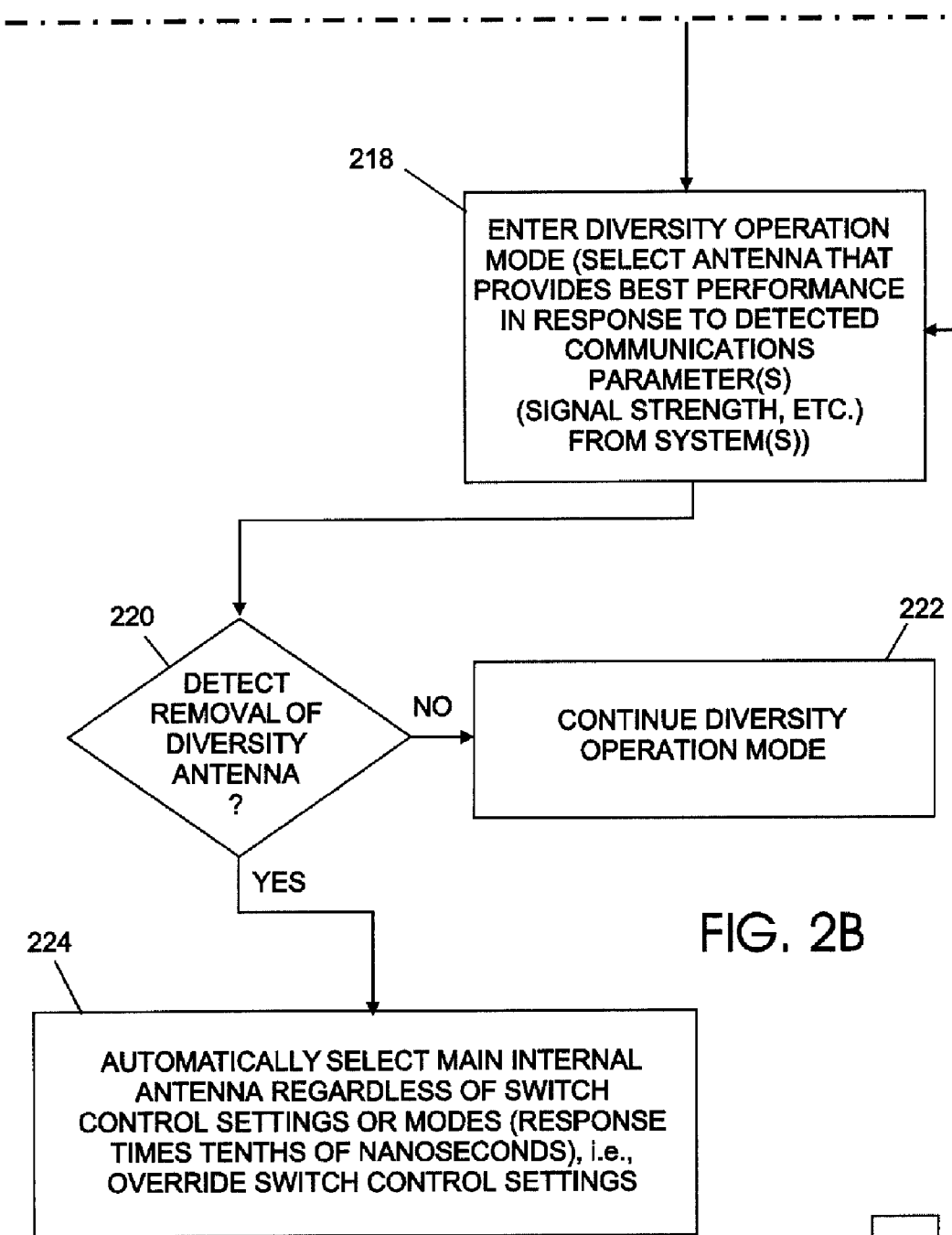

SYSTEM AND METHOD FOR IMPLEMENTING ANTENNA DIVERSITY

BACKGROUND OF THE INVENTION

The present invention relates to communications devices and systems, and more particularly to a communications device, system and method for implementing antenna diversity.

Mobile communications devices, such as cellular telephones and like, because of their mobility can be transported into different geographical locations that may be serviced by different systems operating on different standards or mobile access protocols. Accordingly, mobile communications devices are being designed to operate in multiple different systems and under multiple different standards and frequency bands. In some geographic locations communications performance on some systems may be better than on others and the ability to switch between different radio sections or transceivers and different antennas of a mobile communications device or between a fixed, internal antenna and a removable antenna connectable to the mobile communications device may be desirable for optimum communications. There may also be circumstances where simultaneous communications on different systems or different communications standards may be desirable that may necessitate full antenna diversity. Full antenna diversity can present a challenge to minimize the additional losses in a transmission path that result from the introduction of additional components, such as switches or the like.

BRIEF SUMMARY OF THE INVENTION

In accordance with an embodiment of the present invention, a system for implementing antenna diversity may include a first switch to selectively connect a first radio section to one of a plurality of antennas and a second switch to selectively connect a second radio section to one of the plurality of antennas. The system may also include an antenna detector to detect which one of the plurality of antennas is connected to a port of the first radio section and to a port of the second radio section.

In accordance with an embodiment of the present invention, a system for implementing antenna diversity may include a first switch to selectively connect a first radio section to one of a plurality of antennas and a second switch to selectively connect a second radio section to one of the plurality of antennas. The system may further include a switch control line to each of the first and second switches. The switch control lines may be ganged together electrically for a connection to be made from either the first radio section or the second radio section to one of the plurality of antennas and to always connect both the first and second radio sections to one of the plurality of antennas.

In accordance with another embodiment of the present invention, a communications device may include a plurality of antennas to provide antenna diversity. The plurality of antennas may include a fixed antenna and a removable antenna. The communications device may also include a first radio section and a second radio section. A first switch may be provided to selectively connect the first radio section to one of the fixed antenna or the removable antenna, and a second switch may be provided to selectively connect the second radio section to one of the fixed antenna and the removable antenna. The communications device may further include a detector to detect a valid antenna connection to a port of each radio section.

In accordance with an embodiment of the present invention, a method for implementing antenna diversity may include detecting whether a diversity antenna is present and selecting a main internal antenna for all communications in response to the diversity antenna not being present. The method may also include entering a diversity operation mode in response to the diversity antenna being present.

In accordance with another embodiment of the present invention, a computer program product for implementing antenna diversity may include a computer readable medium having computer usable program code embodied therein. The computer readable medium may include computer usable program code configured to detect whether a diversity antenna is present. The computer readable medium may also include computer usable program code configured to select a main internal antenna for all communications in response to the diversity antenna not being present. The computer readable medium may further include computer usable program code configured to enter a diversity operation mode in response to the diversity antenna being present.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIGS. 2A and 2B (collectively FIG. 2) are a flow chart of an example of a method for implementing antenna diversity in accordance with an embodiment of the present invention.

DETAILED DESCRIPTION OF THE INVENTION

Figure 1B:
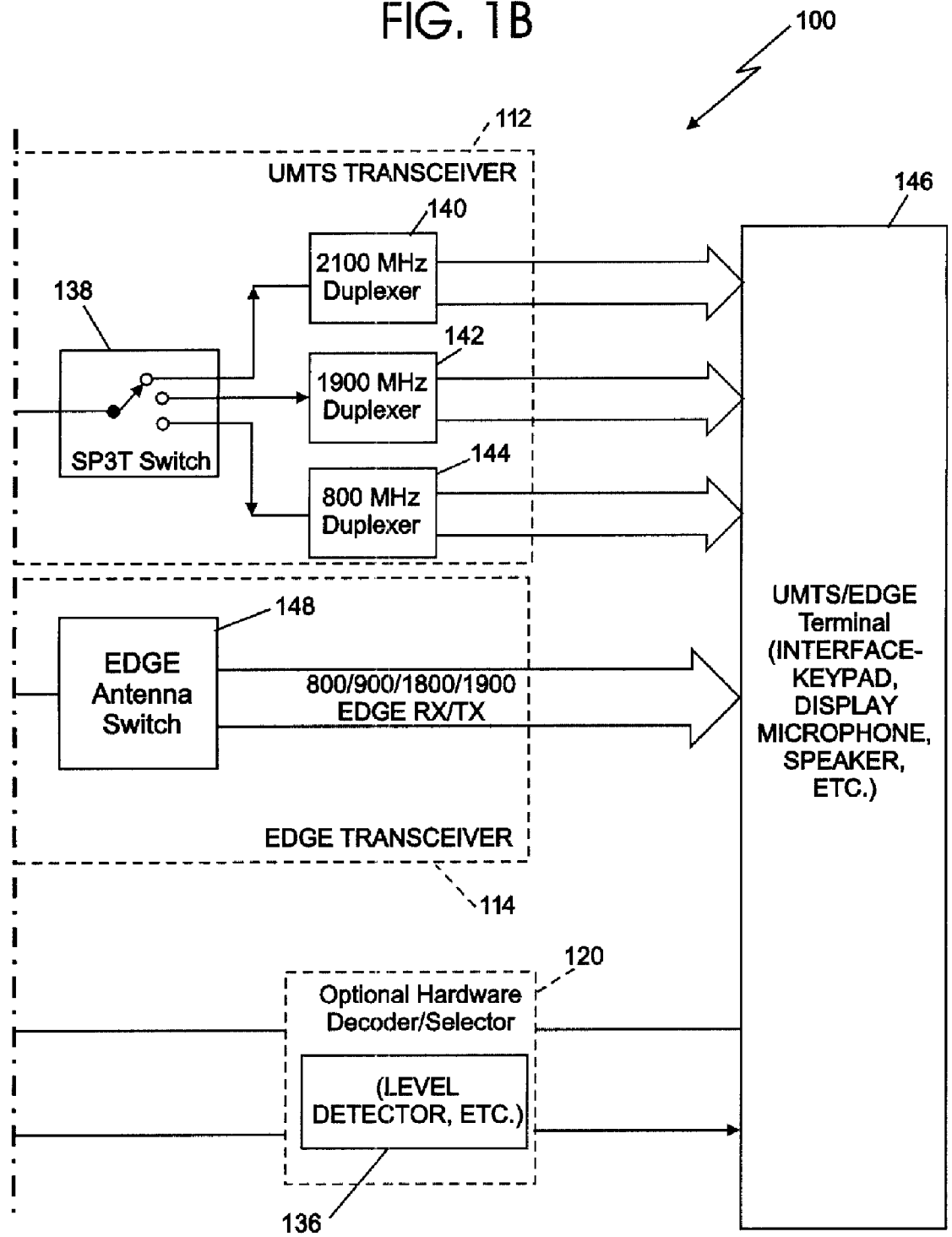
FIG. 1 is block schematic diagram of an exemplary communications device and system for implementing antenna diversity in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is block schematic diagram of an exemplary communications device 100 and system 102 for implementing antenna diversity in accordance with an embodiment of the present invention. The communications device 100 may include a plurality of antennas 104. The plurality of antennas 104 may include a main antenna 106 and a diversity antenna 108. As illustrated in the embodiment of FIG. 1, the main antenna 104 may be an external antenna that may be removable and may plug into a radio frequency (RF) connector 110, jack or other type antenna connection means. The diversity antenna 108 may be a fixed, internal antenna. In other embodiments of the present invention, the main antenna 106 may be a fixed, internal antenna and the diversity antenna 108 may be removable.

The communications device 100 may also include a first radio section 112 and a second radio section 114. The first radio section 112 may be a Universal Mobile Telecommunications System (UMTS) type transceiver or other type transceiver and the second radio section 114 may be an Enhanced Data for GSM (Global System Mobile Communications) Evolution (EDGE) type transceiver or other type transceiver. A first switch 116 may selectively connect the first radio section 112 or UMTS transceiver to one of the main antenna 106 or the diversity antenna 108. A second switch 118 may selectively connect the second radio section 114 or EDGE transceiver to one of the main antenna 106 or the diversity antenna 108. The first switch 116 and second switch 118 may each be a single pole, double throw (SPDT) radio frequency (RF) switch or other type device for selecting between alternative RF signal paths or antennas. This switching arrangement allows full antenna diversity (Tx and Rx) for both UMTS and EDGE radios with only a single additional switch element loss in the transmission path from either antenna to either transceiver. Additionally, the two SPDT switch elements 116 and 118 connected in this manner permit either radio section 112 or 114 (UMTS or EDGE) to be connected to either antenna 106 or 108 through only one switch 116 or 118. This arrangement also allows both simultaneous EDGE and UMTS operation, i.e., non-compressed mode operation, if needed.

The first switch 116 and the second switch 118 may be controlled by a decoder/selector module or hardware controller 120. The decoder/selector module or hardware controller 120 may control which of the plurality of antennas 104 is respectively coupled to each of the radio sections 112 and 114. As described in more detail with respect to FIG. 2, this control may be automatic based on which systems are available and the relative performance parameters, such as signal strength or other operational parameters, measurable from each available system. Alternatively, which antenna is connected to which radio section may be controlled by the user. Accordingly, the decoder/selector module or hardware controller 120 may be optional in some embodiments of the present invention.

The control lines for the switches 116 and 118 may be ganged together as illustrated by the broken line 121 or antenna select switch control lines (illustrated by a single line in FIG. 1 for purposes of clarity). Ganging the control lines 121 of the switches 116 and 118 together electrically provides a connection from either transceiver 112 and 114 to either antenna 106 and 108. Both transceivers 112 and 114 may then always be connected to one of the antennas 106 and 108. This connection allows the controller or selector 120 to toggle a given radio transceiver 112 and 114 between antennas with a single control line, and allows both radio transceivers 112 and 114 to operate simultaneously if desired. This is possible since the two antennas 106 and 108 are physically and electrically isolated. UMTS has a non-compressed mode that requires this exact mode of operation, but this has not gotten much attention due to the difficulty of having two radios on at once.

The communications device 100 may also include an antenna detector 122 to detect which one of the plurality of antennas 104 may be connected to a port 124 of the first radio section 112 and which one of the plurality of antennas 104 may be connected to a port 126 of the second radio section 114. The antenna detector 122 may also incorporate or define an antenna removal sensor 128 to detect removal of a removable antenna, such as the main antenna 106 as illustrated in the embodiment of the present invention shown in FIG. 1. The antenna detector 122 or removal sensor 128 may include the connector 110 which may be associated with a switch 130 or the like that may be mechanically operated or operated by other means. The detector 122 or sensor 128 may also include a power source 132 (Vcc) and a voltage divider resistor circuit 134 (resistors 134a and 134b) coupled to ground potential 135 or a similar arrangement for detecting the presence or removal of an antenna. The antenna detector 122 or removal sensor 128 may also include a level detector 136 that may be part of a decoder/selector module or hardware device 120. An antenna detect signal 138 may be transmitted from the antenna detector 122 to the level detector 136.

The communications device 100 may also include a multipole RF switch 138 that may be associated with the first radio section 112 or UMTS transceiver. The multipole RF switch 138 may be a single pole triple throw (SP3T) switch or the like to select between different sub-radio sections in the first radio section 112. The different sub-radio sections may accommodate operation on different frequency bands. For example, the multipole switch 138 may be controlled to select between a 2100 MHz duplexer 140, a 1900 MHz duplexer 142, an 800 MHz duplexer 144 or similar components. Each of the duplexers 140, 142 and 144 may be coupled to a UMTS/EDGE mobile communications terminal 146 or the like. The terminal 146 may include components to interface with a user and for the user to control operation of the communications device 100. The components (not shown for purposes of clarity) may include a keypad, a display, microphone, speaker or other components common to mobile communications devices to facilitate control and operation of the device by a user.

The communications device 100 may also include an EDGE antenna switch 148 or module. The EDGE switch 148 may selectively couple one of the plurality of antennas 104 via the second switch 118 to an appropriate frequency portion or section (800 MHz, 900 MHz, 1800 MHz or 1900 MHz) of the EDGE transceiver 114. The EDGE antenna switch 148 may be coupled to the UMTS/EDGE terminal 146.

FIGS. 2A and 2B (collectively FIG. 2) are a flow chart of an example of a method 200 for implementing antenna diversity in accordance with an embodiment of the present invention. The method 200 may be embodied in or performed by the communications device 100 of FIG. 1 or a similar communications device. In block 202, the communications device, such as the device 100 of FIG. 1, may be powered up or may the communications device enter a new geographical region with new or additional communications networks or systems available. In block 204, a determination may be made if a diversity antenna is present. If a determination is made in block 204 that a diversity antenna is present, the method 200 may advance to block 218. In block 218, the communications device may enter a diversity operation mode. In the diversity operation mode, the communications device or the user may select an antenna of a plurality of antennas, similar to antennas 104 of FIG. 1, that may provide the best performance in response to a detected or measured communications parameter or parameters from the system, such as signal strength or other parameters associated with the communications quality of the system.

If a determination is made in block 204 that a diversity antenna is not present, the method 200 may advance to block 206. In block 206, a main or fixed internal antenna associated with the communications device may be selected for all communications. In block 208, the communications parameter or parameters associated with the available systems may be periodically measured. In block 210, a determination may be made if the measured parameter or parameters, such as signal strength, exceeds a predetermined level or limit. If the predetermined level or limit has not been exceeded, the method 200 may return to block 208 and the parameter or parameters may continue to be periodically measured. If the predetermined level or limit has been exceeded, for example, the signal strength falls below a predetermined level, the method 200 may advance to block 212.

In block 212, a message may be presented to the user advising the user that the measured parameter, such a signal strength, is marginal or below a predetermined threshold and that operation may be best on another antenna, such as an external antenna or the like. The message may be presented on a display, an alert tone may be generated, a voice prompt may be generated via a speaker of the communications device or any combination of these means or other means may be used to advise the user of current operating conditions or that another antenna or diversity antenna operation should be used. The method 200 may then return to block 204 and the method may continue similar to that previously described.

In block 214, an antenna detector means, such as the antenna detector 122 described with respect to the communications device 100 of FIG. 1, may be periodically polled to determine if a diversity antenna has been attached or activated. The polling may be accomplished by detecting a signal on a pin such as a pin associated with the antenna detect line 150 in FIG. 1 or by other means.

In block 216, a determination may be made if the diversity antenna is present. If the determination is made in block 216 that a diversity antenna is not present, the method 200 may return to block 214 and the antenna detector means or the like may continue to periodically poll for the presence of a diversity antenna. If a determination is made in block 216 that a diversity antenna is present, the method 200 may advance to block 218. As previously discussed, the communications device may enter the diversity mode operation in block 218 in response to the detected presence of a diversity antenna.

In block 220, a determination may be made if a diversity antenna has been removed or disconnected from the communications device or removal or disconnection of the diversity antenna may be detected. If removal of the diversity antenna is not detected in block 220, the method 200 may advance to block 222 and operation in the diversity mode may continue. If removal or disconnection of the diversity antenna is detected in block 220, the method 200 may advance to block 224. In block 224, the main antenna or internal, fixed antenna may be automatically selected for all communications regardless of the switch control settings or modes. The response for selecting the internal fixed antenna after removal of a removable antenna may be about tenths of nanoseconds to prevent any damage to components of the communications device, such as power amplifiers, switches and other sensitive components, in the event that a removable antenna is removed without resetting any mode or antenna selector switches to select operation using the internal, fixed antenna.

While the present invention has been described and illustrated with respect to using a UMTS transceiver and an EDGE transceiver, the architecture and methods described herein may be applicable to other types of communications devices operable in other diverse types of environments or communications systems operative according to different protocols or standards.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for implementing antenna diversity, comprising:
    a first type of radio transceiver;
    a second type of radio transceiver;
    an electronic selector module that:
        controls one or more control lines associated with a plurality of SPDT switches to toggle the first type of radio transceiver and the second type of radio transceiver between a plurality of antennas, wherein in a non-compressed mode of operation, the electronic selector module allows simultaneous operation of the first type of radio transceiver and the second type of radio transceiver;
    a first single-pole double-throw ("SPDT") switch comprising two poles and a common terminal, the SPDT switch being controlled by the electronic selector module to selectively connect the first type of radio transceiver to at least one of a plurality of antennas;
    a second SPDT switch comprising two poles and a common terminal, the SPDT switch being controlled by the electronic selector module to selectively connect the second type of radio transceiver to at least one of the plurality of antennas such that the first type of radio transceiver is connected to one of the plurality of antennas when the second type of radio transceiver is connected to another one of the plurality of antennas;
    an antenna detector configured to detect which of the plurality of antennas is connected to a port of the first type radio of transceiver and which of the plurality of antennas is connected to a port of the second type of radio transceiver;
    wherein the system is further configured to:
        measure a communication parameter associated with operation of the first or second type of radio transceiver on a first antenna;
        determine whether the communication parameter falls below a predetermined level; and
        in response to determining the communication parameter falls below the predetermined level, prompting a user of the system to switch operation of the first or second type of radio transceiver to a second antenna.

2. The system of claim 1, wherein the plurality of antennas comprises an internal fixed antenna and a removable antenna.

3. The system of claim 2, further comprising an antenna removal sensor to detect removal of the removable antenna.

4. The system of claim 3, wherein the antenna removal sensor comprises:
    an antenna connector;
    a power source;
    a resistor divider coupleable to the antenna connector and the power source.

5. The system of claim 4, wherein the antenna removal sensor further comprises a level detector to detect removal of the removable antenna.

6. The system of claim 1, wherein the first type of radio transceiver comprises a UMTS transceiver, the UMTS transceiver being operable in the non-compressed mode.

7. The system of claim 6, further comprising a multipole RF switch coupleable to the first switch to select between a plurality of UMTS radio bands.

8. The system of claim 7, further comprising a duplexer for each one of the plurality of UMTS radio bands.

9. The system of claim 1, wherein the second type of radio transceiver comprises an EDGE transceiver.

10. The system of claim 9, further comprising an EDGE antenna switch module coupleable to the second switch.

11. The system of claim 1, wherein the plurality of antennas comprise a main antenna and a diversity antenna.

12. The system of claim 1, wherein the prompting further comprises at least one of: presenting a message on a display, generating an alert tone, and generating a voice prompt via a speaker.

13. The system of claim 1, wherein the electronic selector module controls operation of the first switch and the second switch in response to detecting a presence or absence of a removable one of the plurality of antennas.

14. The system of claim 1, further comprising a mobile communications terminal containing the first type of radio transceiver and the second type of radio transceiver.

15. The system of claim 1, wherein the one or more control lines comprise a ganged control line to control operation of the first SPDT switch and the second SPDT switch.

16. The system of claim 1, wherein the system is further configured to override the electronic selector module's control of the first or second SPDT switch when an antenna is disconnected from a terminal of the first or second SPDT switch.

17. A system for implementing antenna diversity, comprising:

a first type of radio transceiver capable of transmitting and receiving communications signals;

a second type of radio transceiver capable of transmitting and receiving communications signals;

an electronic selector module that controls one or more control lines associated with a plurality of SPDT switches to toggle the first type of radio transceiver and the second type of radio transceiver between a plurality of antennas, wherein in a non-compressed mode of operation, the electronic selector module allows simultaneous operation of the first type of radio transceiver and the second type of radio transceiver;

a first single-pole double-throw ("SPDT") switch being controlled by the electronic controller module to selectively connect the first type of radio transceiver to any one of a plurality of antennas; and a second SPDT switch being controlled by the electronic controller module to selectively connect the second type of radio transceiver to any one of the plurality of antennas;

wherein the system is further configured to:
measure a communication parameter associated with operation of the first or second type of radio transceiver on a first antenna;
determine whether the communication parameter falls below a predetermined level; and
in response to determining the communication parameter falls below the predetermined level, prompting a user of the system to switch operation of the first or second type of radio transceiver to a second antenna.

18. The system of claim 17, wherein the prompting further comprises at least one of: presenting a message on a display, generating an alert tone, and generating a voice prompt via a speaker.

19. The system of claim 17, further comprising an antenna sensor to sense removal of one of the plurality of antennas.

20. The system of claim 17, wherein the first type of radio transceiver comprises a UMTS transceiver and the second type of radio transceiver comprises an EDGE transceiver.

21. The system of claim 20, wherein the UMTS transceiver is operable in a non-compressed mode.

22. A communications device, comprising:
a plurality of antennas to provide antenna diversity, wherein the plurality of antennas includes a fixed antenna and a removable antenna;
a first type of radio transceiver;
a second type of radio transceiver;
an electronic selector module that controls one or more control lines associated with a plurality of SPDT switches to toggle the first type of radio transceiver and the second type of radio transceiver between a plurality of antennas, wherein in a non-compressed mode of operation, the electronic selector module allows simultaneous operation of the first type of radio transceiver and the second type of radio transceiver;
a first single-pole double-throw ("SPDT") switch being controlled by the electronic controller module to selectively connect the first type of radio transceiver to any one of the fixed antenna and the removable antenna;
a second SPDT switch being controlled by the electronic controller module to selectively connect the second type of radio transceiver to at least one of the fixed antenna and the removable antenna such that the first type of radio transceiver is connected to one of the fixed antenna and the removable antenna when the second type of radio transceiver is connected to another one of the fixed antenna and the removable antenna; and a detector to detect a valid antenna connection to a port of each radio transceiver, wherein the system is further configured to:
measure a communication parameter associated with operation of the first or second type of radio transceiver on a first antenna;
determine whether the communication parameter falls below a predetermined level; and
in response to determining the communication parameter falls below the predetermined level, prompting a user of the system to switch operation of the first or second type of radio transceiver to a second antenna.

23. The communications device of claim 22, wherein the first type of radio transceiver comprises a UMTS transceiver.

24. The communications device of claim 23, further comprising a multipole RF switch coupleable to the first switch to select between a plurality of UMTS radio bands.

25. The communications device of claim 22, wherein the second type of radio transceiver comprises an EDGE transceiver.

26. The communications device of claim 25, further comprising an EDGE switch module coupleable to the second switch.

27. The communications device of claim 22, wherein the prompting further comprises at least one of: presenting a message on a display, generating an alert tone, and generating a voice prompt via a speaker.

28. The communications device of claim 22, wherein the one or more control lines comprise ganged control switch lines to control operation of the first SPDT and second SPDT switches.

29. A method for implementing antenna diversity, comprising:
controlling, using an electronic selector module, one or more control lines associated with a plurality of SPDT switches to toggle a first type of radio transceiver and a second type of radio transceiver between a plurality of antennas, wherein in a non-compressed mode of operation, the electronic selector module allows simultaneous operation of the first type of radio transceiver and the second type of radio transceiver;
controlling operation of a first single-pole double-throw ("SPDT") switch configured to selectively connect the first type of radio transceiver to any one of a main internal antenna and a diversity antenna;
controlling operation of a second SPDT switch configured to selectively connect the second type of radio transceiver to any one of the main internal antenna and the diversity antenna;
measuring a communication parameter associated with operation of the first or second type of radio transceiver on a first antenna;
determining whether the communication parameter falls below a predetermined level; and
in response to determining the communication parameter falls below the predetermined level, prompting a user of the system to switch operation of the first or second type of radio transceiver to a second antenna.

30. The method of claim 29, further comprising:
detecting whether a diversity antenna is present; and
selecting a main internal antenna for all communications in response to the diversity antenna not being present.

31. The method of claim 29, further comprising:
periodically determining whether the communication parameter falls below the predetermined level.

32. The method of claim 30, further comprising:
periodically polling to determine if a diversity antenna has been attached for communications; and
entering the diversity operation mode in response to detecting a presence of the diversity antenna.

33. The method of claim 29, wherein the prompting further comprises at least one of: presenting a message on a display, generating an alert tone, and generating a voice prompt via a speaker.

34. The method of claim 32, further comprising:
overriding one or more switch control settings and automatically selecting the main internal antenna in response to detecting removal of the diversity antenna; and
continuing to operate in the diversity operation mode in response to the diversity antenna being detected.

35. The method of claim 29, wherein the first type radio transceiver is connected to one of the main internal antenna and the diversity antenna when the second type of radio transceiver is connected to another one of the main internal antenna and the diversity antenna.

36. The method of claim 29, wherein the first type of radio transceiver is an EDGE transceiver and the second type of radio transceiver is a UMTS transceiver.

37. A non-transitory computer readable storage medium for implementing antenna diversity, the computer readable storage medium comprising:
computer usable program code configured to control, using an electronic selector module, one or more control lines associated with a plurality of SPDT switches to toggle a first type of radio transceiver and a second type of radio transceiver between a plurality of antennas, wherein in a non-compressed mode of operation, the electronic selector module allows simultaneous operation of the first type of radio transceiver and the second type of radio transceiver;
computer usable program code configured to control operation of a first single-pole double-throw ("SPDT") switch to selectively connect the first type of radio transceiver to any one of a main internal antenna and a diversity antenna;
computer usable program code configured to control operation of a second SPDT switch to selectively connect the second type of radio transceiver to any one of the main internal antenna and the diversity antenna;
computer usable program code configured to measure a communication parameter associated with operation of the first or second type of radio transceiver on a first antenna;
computer usable program code configured to determine whether the communication parameter falls below a predetermined level; and
computer usable program code configured to, in response to determining the communication parameter falls below the predetermined level, prompt a user of the system to switch operation of the first or second type of radio transceiver to a second antenna.

38. A non-transitory computer readable storage medium of claim 37, further comprising:
computer usable program code configured to detect whether a diversity antenna is present; and
computer usable program code configured to select a main internal antenna for communications in response to the diversity antenna not being present.

39. A non-transitory computer readable storage medium of claim 37, further comprising:
computer usable program code configured to periodically poll to determine if a diversity antenna has been attached for communications; and
computer usable program code configured to enter the diversity operation mode in response to detecting a presence of the diversity antenna.

40. A non-transitory computer readable storage medium of claim 37, wherein the computer usable program code configured to prompt further comprises at least one of: computer usable program code configured to present a message on a display, computer usable program code configured to generate an alert tone, and computer usable program code configured to generate a voice prompt via a speaker.

41. A non-transitory computer readable storage medium of claim 39, further comprising:
computer usable program code configured to override one or more switch control settings and automatically select the main internal antenna in response to detecting removal of the diversity antenna; and
computer usable program code configured to continue to operate in the diversity operation mode in response to the diversity antenna being detected.

42. A non-transitory computer readable storage medium of claim 41, further comprising computer usable program code configured to periodically determine whether the communication parameter falls below the predetermined level.

\* \* \* \* \*